Patented Mar. 20, 1934

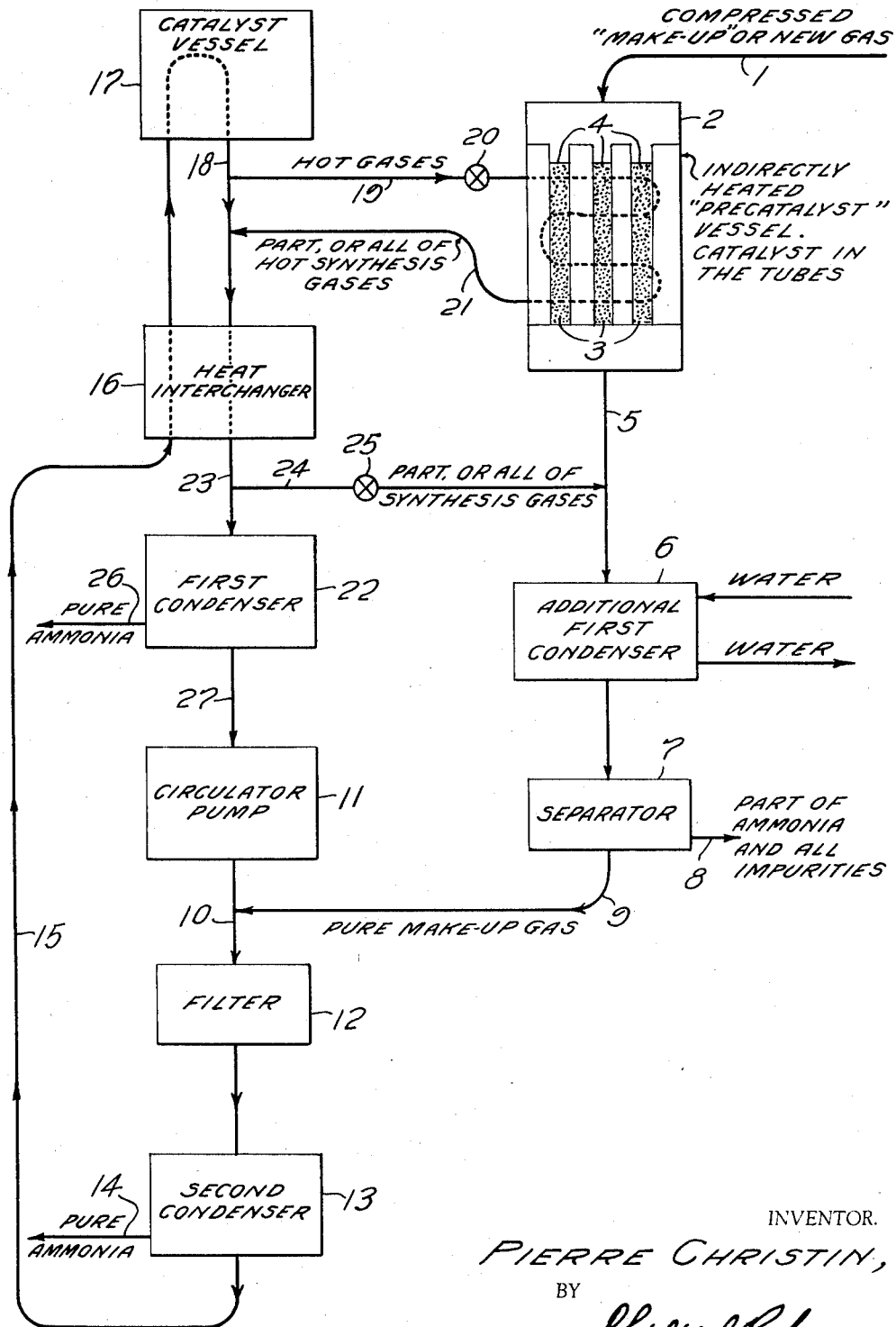

1,951,819

UNITED STATES PATENT OFFICE 1,951,819

PROCESS FOR PURIFYING GASES FOR AMMONIA SYNTHESES

Pierre Christin, Paris, France, assignor to Chemical Engineering Corporation, New York, N. Y., a corporation of Delaware Application November 25, 1930, Serial No. 497,961
In Germany June 24, 1930

4 Claims. (Cl. 23—199)

My invention relates more particularly in its application to one part of the process of catalytically producing ammonia from a mixture of nitrogen and hydrogen gases in combining proportions, in which the gas mixture or "make-up" gas is purified of such impurities as lower the ammonia production by impairing or poisoning the catalyst.

My invention may be practiced in connection with apparatus as is illustrated in the flow-sheet drawing which represents a preferred form of procedure in purifying the gases in conjunction with the ammonia synthesis according to the novel methods hereinafter described.

It is a well-known fact that oxygen, water, carbon monoxide and other impurities exert a harmful effect upon the catalytic mass used for the ammonia synthesis, and that these impurities, even in small quantities, eventually bring forth an impairment in the effectiveness of the catalyst.

A number of processes have already been proposed with a view to removing these harmful impurities in the gases, whereby the effectiveness of the catalyst employed in the ammonia synthesis is prolonged, but they are usually more or less specific for either one or the other impurity, and do not permit the elimination of all the impurities if they are brought into application alone.

It has been proposed to convey a fresh or purifying gas being, a mixture of hydrogen and nitrogen containing impurities, into the gas leaving the ammonia synthesis, and more specifically before the total or final condensation of the ammonia, since this condensation takes the impurities along with it. However, the ammonia removes particularly only the materials that are soluble in $NH_3$ or that combine with it, for example, water, $CO_2$, and also oil traces and other suspended parts etc.

On the other hand under special conditions, the hydrogen present in the gas mixture can combine likewise with the oxygen and other impurities so as to form water or other combinations. However, in actual practice it is usually necessary to use a special catalyst in order to form these combinations. Furthermore it is essential to obtain a sufficiently high temperature, although the reaction is exothermic; despite the use of heat exchangers, a supplemental source of heat is generally required. Moreover, the removal of the water formed through cooling and condensation is not complete, and water is in itself a catalyst poison.

According to my improved processes to be set forth, it has been sought to combine these two separate purification processes, in which the practical operation has been facilitated, without, however, the purification so obtained (as far as the removal of the impurities is concerned) being less than in cases where the two processes heretofore mentioned have been successively employed.

The following is a description of my improved process according to the invention, its requirements, and its advantages:

The nitrogen-hydrogen gas mixture, or "make-up" gas along with the impurities, is compressed at a like pressure as that used in the synthesis. The compression might of course be any other one, but this assumption must be made, in order to simplify the ammonia production in industrial operations. The compressed gas, as it leaves the compressors is already at the highest possible temperature of about 100° C., but must be brought to a still higher temperature around 450° C., which depends largely upon the pressure produced. In practice this raising of the temperatures of the gas is accomplished by means of heat exchangers, to which usually an electric heating unit is joined. Such somewhat complicated and unsatisfactory electric heating is unnecessary in my present process, since the temperature necessary for the pre-catalysis is obtained through recovery and use made of the heat developed by the reaction of the ammonia synthesis.

The gas may be conducted either in direct heat exchange relationship with the catalytic mass of the ammonia synthesis, in order to maintain the temperature of the catalytic mass uniform and at its best efficiency, or it may be conveyed in a separate heat exchanger or in the apparatus of the pre-catalysis. The heat exchange in any case is indirect, that is to say, the gases are not mixed with the gas emanating from the ammonia synthesis so as to avoid any dilution, which would not only require a heavier pre-catalytic mass, but furthermore might injure the combination of hydrogen and oxygen as a result of the law of mass action and might also diminish at the same time the quantity of heat supplied by this exothermic reaction as a consequence of the spreading over a greater volume of gas.

The heat interexchanger is heated either by the whole quantity of gas which leaves the converter or only by a part thereof.

The gases are taken off either before or after the heat interexchanger and are combined with those in the ammonia synthesis system.

After the gases have been brought to the temperature desired for the pre-catalysis, they are conducted through the pre-catalytic mass, which may be either in the synthesis converter itself or in the heat interexchanger of the synthesis, if it is separated, or in an apparatus which already contains the heat interexchanger, or in any other apparatus.

After the combination of the hydrogen and of the oxygen of the raw gases, that is to say, after the passage of these gases through the pre-catalytic mass, such gases are first mixed with the whole quantity, or with a part, of the gas leaving the ammonia synthesis and therefore containing ammonia, which eliminates by means of condensation and separation the water and the other impurities emanating from the raw gas.

If therefore it is desired to produce an ammonia that should be as pure as possible, the gas coming from the pre-catalysis is mixed only with a part of the gas leaving the ammonia synthesis.

Referring again to the flow-sheet drawing, the compressed "make-up" gas at a temperature around 100° C. is introduced through the pipe 1 into the top of the pre-catalyst vessel 2 which is indirectly heated by hot gases from the main synthesis, the pre-catalyst 3 being suitably supported in a series of tubes 4 in the vessel 2. The gas mixture from the vessel 2 passes through the pipe 5 into the additional first condenser 6 and then through the separator 7 from which part of the ammonia and all the impurities emanating from the raw gas are removed through the outlet 8.

The purified "make-up" gas leaves the separator 7 by the pipe 9 joined to the pipe 10 connecting the circulator pump 11 and the filter 12 in the main circulating system. After passing through the filter 12, the gases flow through the second condenser 13 from which pure ammonia is taken off by the outlet 14. The gas from the condenser 13 passes through the pipe 15 through the heat interchanger 16 and then through the catalyst vessel 17 and then after the synthesis is returned to the heat interchanger 16 through the pipe 18. Joined to the pipe 18 is the pipe 19 having the control valve 20 by which pipe 19 part or all of the hot gases from the vessel 17 are circulated as shown around the pre-catalyst 3 in the vessel 2 to heat same to the proper temperature for the pre-catalysis and are then returned to the pipe 18 through the pipe 21. Between the heat interchanger 16 and first condenser 22 is the pipe 23 connected by the pipe 24 having the control valve 25 to the pipe 5 by which a part or all of the synthesis gases may be passed into the condenser 6. Pure ammonia may be taken from the condenser 22 by the outlet 26 and the gases from the condenser 22 pass through the pipe 27 into the circulator pump 11 by which the gases pass through the pipe 10 into the filter 12.

It will be observed that, according to my invention, the pre-catalyst vessel 2 enables the new "make-up" gas to be treated before this gas is added to the circulating system by subjecting same to a catalytic reaction in the vessel 2, through raising the temperature of this gas to proper reaction temperatures for reaction with the catalyst 3. This part of my process is attained by indirectly heating the "make-up" gas by the hot gases leaving the main catalyst vessel 17, but without mixing these pure gases to the "make-up" gas until the reaction products and impurities have been removed.

To effect such removal, part of the main circulating system gases containing ammonia may be condensed to yield liquid ammonia and such liquid ammonia is then brought into direct contact with the cooled, purified "make-up" gases containing liquefied ammonia so that the impurities formed will either be dissolved or react with a proportion of the main amount of ammonia in the system and so be eliminated through the outlet 8.

My invention is of practical use because in an industrial ammonia unit the heat of reaction from the synthesis is far more than enough to maintain the reaction, and a large amount of valuable heat is removed in the water condenser. I propose using this heat to operate the pre-catalyst working only on a relatively small amount of "make-up" gas, but using same at a higher heat than that prevailing in the first water condenser by passing indirectly a portion of the hot gases directly from the main body of catalyst to such pre-catalyst.

The new process has the advantage of bringing forth the maximum purification, that is to say, it extends the effectiveness of the catalyst of the synthesis and also simplifies the pre-catalysis as well as regains the heat liberated by reaction of the nitrogen and of the hydrogen or of another warm gas, and finally obtains the greatest possible quantity of pure ammonia taken from the system.

I claim as my invention:—

1. The process for purifying gases for ammonia synthesis containing impurities, which comprises preheating the make-up gas by heat exchange with the main catalyst of the synthesis, then bringing the heated gases into reacting contact with a pre-catalyst, mixing the reaction-gases with gases from the ammonia synthesis, and condensing and separating impurities from the make-up gases before passing same to the ammonia synthesis and then passing said purified gases to an ammonia synthesis.

2. The process for purifying gases for ammonia synthesis containing impurities, which comprises preheating the make-up gas by heat exchange with the main catalyst of the synthesis, then bringing the heated gases into reacting contact with a pre-catalyst, mixing the reaction-gases with controlled amounts of gases from the ammonia synthesis, and condensing and separating impurities from the make-up gases before passing same to the ammonia synthesis and then passing said purified gases to an ammonia synthesis.

3. The process for purifying gases for ammonia synthesis containing impurities, which comprises preheating the make-up gas by indirect heat exchange with hot gases from the main catalyst of the synthesis, then bringing the heated gases into reacting contact with a pre-catalyst, mixing the reaction-gases with controlled amounts of gases from the ammonia synthesis, and condensing and separating impurities from the make-up gases before passing same to the ammonia synthesis and then passing said purified gases to an ammonia synthesis.

4. The process for purifying gases for ammonia synthesis containing impurities, which comprises preheating the make-up gas by indirect heat exchange with controlled amounts of hot gases from the main catalyst of the synthesis, then bringing the heated gases into reacting contact with a pre-catalyst, mixing the reaction-gases with controlled amounts of gases from the ammonia synthesis, and condensing and separating impurities from the make-up gases before passing same to the ammonia synthesis and then passing said purified gases to an ammonia synthesis.

PIERRE CHRISTIN.